Jan. 25, 1938.    W. J. COX    2,106,421
CIRCUMFERENTIALLY DIVIDED WHEEL RIM
Original Filed Nov. 4, 1935
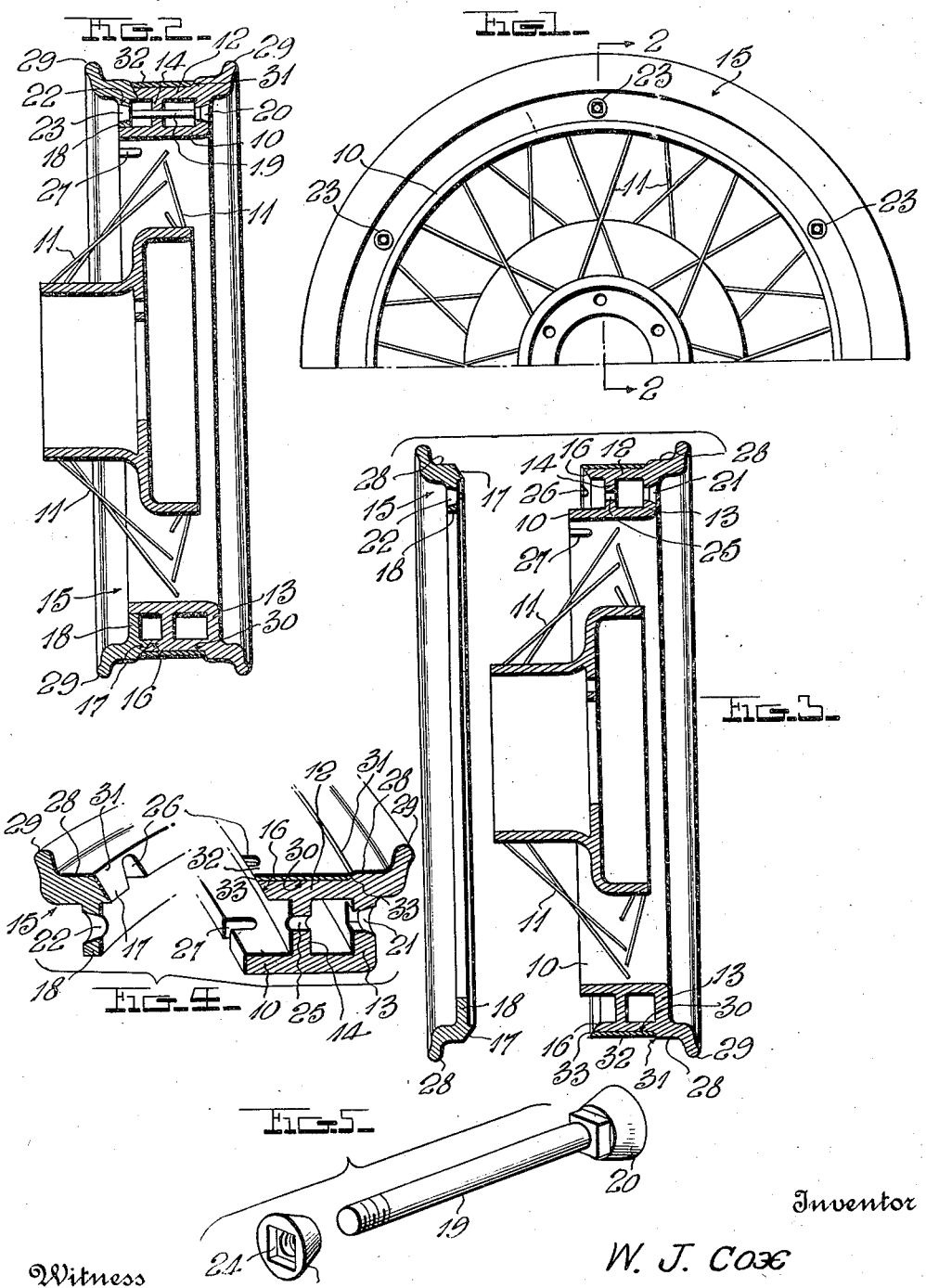
Inventor
W. J. COX
Witness
H. Woodard
By H. B. Williston &co
Attorneys Patented Jan. 25, 1938

2,106,421

UNITED STATES PATENT OFFICE 2,106,421

CIRCUMFERENTIALLY DIVIDED WHEEL RIM

William Jared Cox, Woodruff, Utah

Application November 4, 1935, Serial No. 48,242
Renewed November 10, 1937

1 Claim. (Cl. 152—21)

The invention aims to provide a new and improved rim for modern automobile wheels, of such construction as to greatly facilitate the removal and application of tires.

The rim is provided with a removable outer section to allow a tire to be quickly and easily slipped sidewise onto or from the major section of the rim when said removable section is removed, and a further object of the invention is to provide a novel construction for said major section which is sufficiently strong and rigid to prevent distortion under load and strain. The conventional channel-shaped pressed metal rim of the modern automobile wire-spoked wheel, is stiffened and reinforced along both edges by the bead-engaging flanges and the bead-engaging shoulders contiguous to these flanges. If one of the shoulders and the flange were merely divided circumferentially from the remainder of the rim, the latter would be so weakened that it would not withstand the strains to which it is subjected in use, but would soon distort into irregular shape and run out of alinement. Such difficulties, however, are obviated with the novel construction which I provide.

Between the bead-engaging shoulders of the rim, I provide a shallow peripheral channel containing a tube-protecting band of rubber or other yieldable material, and the side walls of this channel diverge radially and are engaged by beveled edges of the tube-protecting band. The rim is circumferentially split on a line at the juncture of the channel bottom with the outer channel side wall and the split is normally covered by the beveled band portion which lies against this side wall, preventing any possibility of pinching the tube. The tube-protecting band is of less thickness than the depth of the shallow channel, so that when the removable rim section is detached, the band-covered channel bottom will not interfere with easy removal or application of the tire.

With the foregoing in view, the invention resides in the novel subject matter hereinafter described and claimed, description being accomplished by reference to the accompanying drawing.

Fig. 1 is a partial side elevation showing half of the outer side of the improved rim upon a wire wheel.

Fig. 2 is a sectional view on the plane of line 2—2 of Fig. 1.

Fig. 3 is a disassembled sectional view.

Fig. 4 is a fragmentary sectional perspective view.

Fig. 5 is a perspective view of one of the bolts and nuts used to secure the removable rim section in place.

A preferred construction has been illustrated and will be rather specifically described, with the understanding however, that within the scope of the invention as claimed, variations may be made.

A one-piece inner rim 10 is provided for connection with the wheel spokes or the like 11. A main outer rim section 12 of continuous form surrounds and is spaced from the inner rim 10, the inner edge portion of said rim 10 being integrally connected with the surrounding portion of the rim section 12 by a continuous web 13. Another continuous web 14 is disposed between the inner rim 10 and the main rim section 12, and is integrally joined to both. This forms a structure sufficiently strong to withstand all strains during use.

A continuous removable outer rim section 15 is provided, said removable section 15 normally abutting the outer edge of the rim section 12. These abutting edges of the rim sections 12 and 15 are preferably beveled as shown at 16 and 17 respectively. The rim section 15 is provided on its inner periphery with a continuous flange 18 which surrounds or otherwise engages the outer edge portion of the inner rim 10, a rather snug fit being provided.

For securing the rim sections together, I preferably provide transverse bolts 19 between the inner rim 10 and the outer rim 12, 15, said bolts passing through both of the webs 13 and 14 and through the flange 18. The bolt heads 20 and their receiving openings 21 are shaped to hold the bolts against rotation and said heads are preferably countersunk as shown. The openings 22 in the flange 18 are preferably occupied by the nuts 23 of the bolts 19, these nuts being countersunk in said openings and being provided with sockets 24 for engagement with a suitable speed wrench. The bolt-receiving openings of the web 14 are shown at 25.

While a valve stem opening could be formed only in the main section of the rim, the valve may be much more easily handled if the abutting sections of the outer rim be formed with coacting valve stem-receiving notches 26 and the inner rim 10 formed with a notch 27.

The outer rim is provided with two bead-engaging shoulders 28, with two bead-engaging flanges 29 at the outer edges of these shoulders, and with a shallow channel 30 between said shoulders, said channel having radially diverging side walls 31 which extend to the shoulders 28. The contacting surfaces 16, 17 of the two rim sections are preferably flush with the channel side wall 31 of the removable section 15, as shown. The bottom of the channel 30 is surrounded by a tube-protecting band 32 of rubber or other yieldable material, the edges of this band being beveled at 33 to lie tightly against the diverging side walls 31 of the channel. The beveled edge 33 of the band which abuts the channel side wall 31 of the removable rim section 15, covers the split between the two rim sections and thus prevents chafing or pinching of the tube. The band 32 is of a thickness somewhat less than the depth of the shallow channel 30 so that the band-covered channel bottom will not interfere with easy application or removal of a tire but on the contrary will clear the tire beads.

To remove a tire from a rim, it is simply necessary to remove the nuts 23, take off the removable rim section 15, and merely pull the tire from the main rim section. To re-apply the same tire or apply another, it is simply slipped laterally onto the main section of the rim, the valve stem positioned in the notches 26 and 27 of said main section, the rim section 15 re-applied, and the nuts 23 threaded onto the bolts and tightened.

It will be seen from the foregoing that novel and advantageous provision has been made for carrying out the objects of the invention. While the details disclosed are preferable, variations may be made within the scope of the invention as claimed.

I claim:—

A circumferentially divided wheel rim comprising a continuous one-piece inner rim, one annular web surrounding said inner rim and integrally joined to the inner edge thereof, a second annular web surrounding said inner rim and integrally joined thereto substantially midway between the inner and outer edges of said inner rim, a main outer rim section surrounding both of said webs and integrally joined near its inner edge to said one web, said main rim section being integrally joined between its edges to said second web and projecting outwardly from the same to a lesser extent than said inner rim projects therefrom, a removable rim section abutting the outer edge of said main rim section, said removable rim section having an annular flange widely spaced outwardly from said second web and snugly surrounding the outer edge portion of said inner rim, and bolts passing through said webs and flange and securing said removable rim section against said main section.

WILLIAM JARED COX.